Nov. 17, 1970 R. L. YACHABACH 3,541,263

POST PAY TELEPHONE CONTROL UNIT

Filed Dec. 5, 1967 2 Sheets-Sheet 1

INVENTOR
RONALD L. YACHABACH

BY Ayat Dowell
ATTORNEYS

Nov. 17, 1970 R. L. YACHABACH 3,541,263

POST PAY TELEPHONE CONTROL UNIT

Filed Dec. 5, 1967 2 Sheets-Sheet 2

INVENTOR
RONALD L. YACHABACH

BY A. Yates Dowell & A. Yates Dowell, Jr.
ATTORNEYS 3,541,263
POST PAY TELEPHONE CONTROL UNIT
Ronald L. Yachabach, Lakeland, Fla., assignor to Teltronics, Inc., Lakeland, Fla.
Filed Dec. 5, 1967, Ser. No. 688,091
Int. Cl. H04m 17/02
U.S. Cl. 179—6.3 14 Claims

ABSTRACT OF THE DISCLOSURE

In a pay telephone system in which current flows in a first direction when parties are not in contact and in a reverse direction when the parties are connected to each other, and in which conversation obstruction means are placed in the circuit when line polarity reverses after the parties first reach each other and are removed upon deposit of proper coins, improvement comprising a first relay for placing the conversation obstruction means into the circuit when current first flows in the reverse direction, a second relay energized following the deposit of coins for restoring the current through the first relay to the initial direction while line polarity continues in the reverse direction, a capacitor for delivering a charge to assist in the energization in the second relay upon deposit of proper coins and for restoring the second charge while line polarity flows in said initial direction, a first rectifying diode for preventing discharge of said capacitor upon reverse of said line polarity before deposit of coins, and a third relay means for restoring the contacts of the second relay to their initial position including switch means closed by the second relay and opened by its own movement after energization, and a second rectifying diode preventing passage of current through the third relay coil except when line polarity flows in the initial direction.

BACKGROUND OF THE INVENTION (1) Field of the invention.—This invention relates to pay telephone controls and more particularly to a control unit which may be substituted in conventional pay telephones for a known prior art unit which places a conversation obstruction means into the telephone circuit when the parties first reach each other, and which removes the obstruction after the deposit of an appropriate coin.

(2) Description of the prior art.—The present invention represents improvement over the control unit disclosed in Pat. No. 1,844,684 issued to Theodore C. Riebe on Feb. 9, 1932. This unit is widely used in rural areas in the United States to place an obstruction to conversation into the line as soon as the called party answers and to remove the obstruction after the calling party deposits an appropriate coin or coins to pay for the call.

The Riebe device operates in response to a change in direction of line polarity which occurs as the calling telephone reaches the called telephone. This current reversal is used to energize an electromagnet to rotate an armature to a position at which certain spring electrical contacts may close. This short circuits the transmitter thus making it impossible for the calling party to talk to the called pary and shunts a resistance across the receiver to make it impossible for the calling party to use the receiver as a transmitter. Deposit of an appropriate coin or coins releases a mechanical linkage which, under the influence of spring action, short circuits the electromagnet and open switches to remove the transmitter short circuit and the receiver shunt from the line. Upon completion of the call and return of line polarity to its initial direction, another electromagnet is energized to return the armature to its initial position. Under the influence of gravity and spring actions, parts of mechanical and electrical contacts are returned to their initial position.

The use of these mechanical parts and spring actuation of electrical contacts requires approximately a dozen adjustments so that the device will satisfactorily operate. Accordingly, installation and maintenance of the unit requires a considerable expenditure of skilled labor.

OBJECTS OF THE INVENTION

Among the objects of the present invention is the provision of a telephone control unit which does not require extensive mechanical adjustment in order to reduce the cost of installation and maintenance.

A further object of the invention is the provision of an all electrical unit for placing conversation obstruction means into a pay telephone circuit when the parties first reach each other, for removing the conversation obstruction means upon deposit of coins, and for returning the system to its initial condition upon completion of the call.

Other objects and advantages of the invention will be apparent from the following description considered in conjunction with the accompanying drawings.

SUMMARY OF THE INVENTION

Briefly stated the present invention includes electrical elements mounted upon a printed circuit board which may be substituted for the electro-mechanical device disclosed in the said Riebe patent. The elements include a first relay connected to a source of line power so that reversal of current flow which takes place when the calling telephone reaches the called telephone will cause the relay core to move to close normally open electrical contacts to short circuit the transmitter and to shunt a resistor across the receiver. A second, or reversing, relay upon deposit of an appropriate coin or coins, is energized to reverse current flow through the first relay to open the conversation obstruction means. The power circuit for the reverse relay includes a capacitor which, during flow of line current in the initial direction accumulates a charge, discharge of which is prevented by a rectifying diode after reversal of line polarity until a coin-controlled switch is closed, at which time current discharges to assist in the energization of the reverse relay. Movement of the reverse relay closes the power supply to a third or return relay. However, a rectifying diode prevents flow of current through a return relay until line polarity returns to its initial position upon completion of the call. The return relay then moves the reverse relay contacts back to their initial position.

Figure 1:
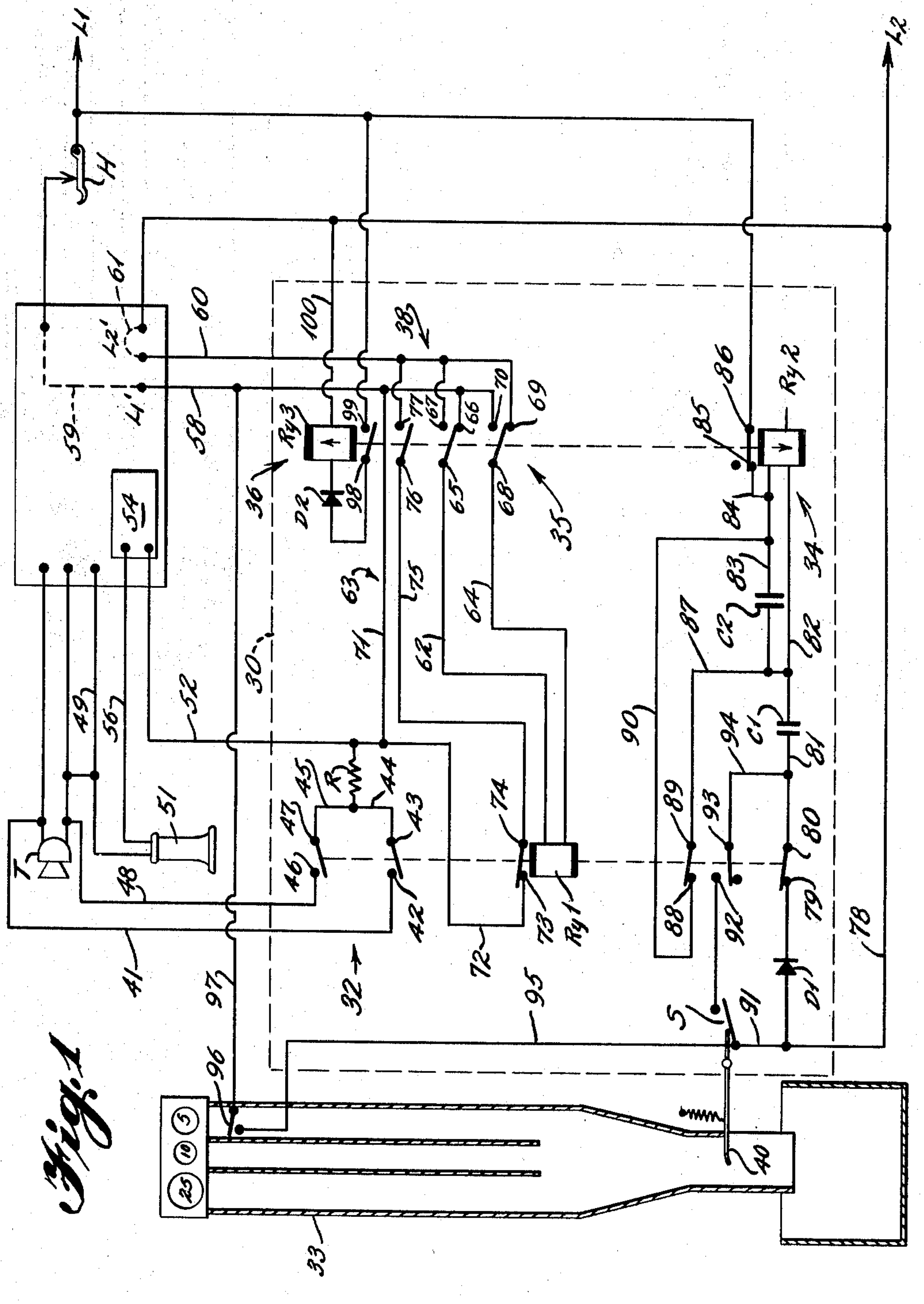
FIG. 1 is a schematic diagram illustrating the electrical connections of the elements of the present invention, other elements of the telephone being shown in schematic fashion.

With reference to the drawings, the principal elements of the present invention are physically located on a printed circuit board 30 with lead wires L1 and L2 extending therefrom for attachment to other telephone equipment. The control unit includes a conversation obstruction circuit 32, including a shunt resistor R which is brought into effect by a conversion obstruction relay Ry1 by reversal of electric current passing through conversation obstruction power circuit 38, which occurs as line polarity changes direction when the calling party reaches the called party. The conversation obstruction circuit 32 remains effective until a coin-controlled switch S is closed in response to dropping of an appropriate coin or coins into chute 33 to thereby energize a reverse power circuit 34, including a rectifying diode D1 and capacitors C1 and C2 to deliver power to a reverse relay coil Ry2 which is part of a two coil latching relay unit 35.

Relay coil Ry2 also closes switch contacts 98, 99 in a return power circuit 36 to connect a reverse relay coil Ry3, the other coil of latching relay unit 35, to source of line polarity. Return power circuit 36 includes a rectifying diode D2 which prevents energization of relay coil Ry3 until line polarity returns to its initial direction when the calling and the called telephones are disconnected as when the conversation is completed.

Figure 2:
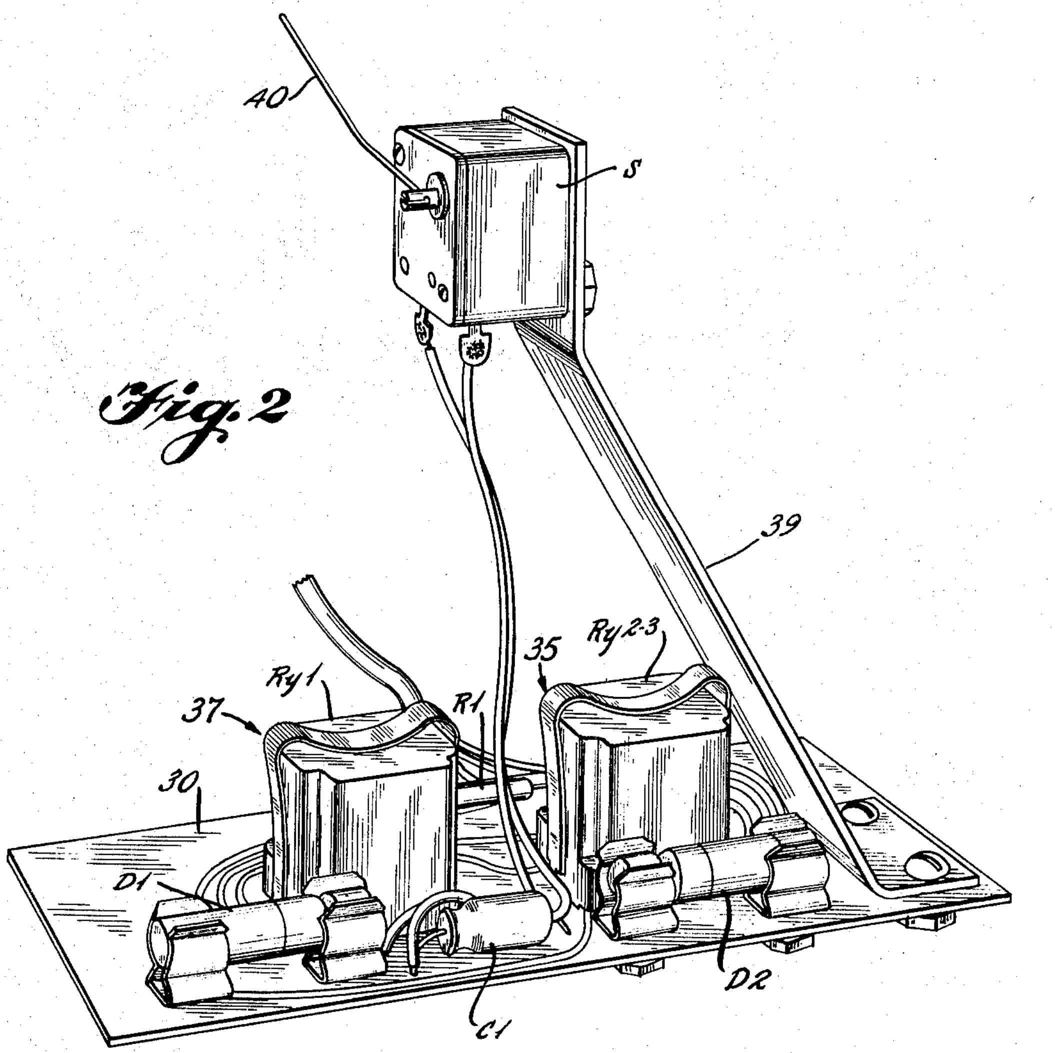
FIG. 2 is a perspective illustrating certain of the electrical elements of the invention mounted upon a printed circuit board.

Referring now to FIG. 2, the elements physically located on the printed circuit board 30 include a first relay unit 37 containing relay coil Ry1 and is associated switch contacts, and a second latching relay unit 35 containing relay coils Ry2 and Ry3 and their associated switch contacts, diodes D1 and D2, capacitors C1 and C2, and appropriate leads printed or coated on the board of some electrically conducted material, together with appropriate contacts for mounting these elements on the board in electrical contact with the desired leads. A bracket 39 is fixed to the board and carries at one end coin-controlled switch S. Switch S includes an arm 40 which extends into coin chute 33 so that it may be physically moved as coins pass through the chute to close the switch. This entire unit is designed to be substituted for the corresponding control unit conventionally used with post pay telephones. Wires are connected to appropriate spots on the cricuit board for attachment to other points in the electrical circuit of the conventional pay telephone.

Returning to the schematic circuit diagram, FIG. 1, the conversation obstruction circuit includes a lead 41 running from the telephone transmitter T to normally open Ry1 switch contacts 42–43, which are connected by leads 44, 45 to Ry1 switch contacts 46–47 thence back to the other side of transmitter T by lead 48. Closing of Ry1 contacts 42–43 and 46–47 short circuits the transmitter.

Conversation obstruction circuit 32 also includes a lead 49 connected from the telephone receiver 51 to transmitter T thence via lead 48, Ry1 switch contacts 46–47, lead 45, shunt resistor R, lead 52, through the dial switches 54 (which close to reach the called party) and lead 56 back to the other side of receiver 51. Closure of Ry1 contacts 46–47 thus shunts resistor R across receiver 51 at the same time as transmitter T is short circuited.

The conversation obstruction relay power circuit 38 for supplying power to conversation obstruction relay Ry1 includes L1 lead 58 and L2 lead 60 connected, respectively, to electrical power sources L1′ and L2′ located within other telephone circuitry. Power source L1′ is connected through miscellaneous internal circuitry shown schematically in FIG. 1 as dotted line 59 through hook switch H (which is only closed when the transmitter-receiver hand set is removed from the hook) and thence to one of the two telephone power lead-ins, L1. Power source L2′ is connected through miscellaneous internal cricuitry shown schematically in FIG. 1 as dotted line 61 to the other telephone power lead-in, L2. Relay Ry1 has power leads 62 and 64 connected directly thereto to conduct current to its coil. Lead 62 is connected to double throw switch 65 having one contact 66 connected to L1 lead 58 and its alternate contact 67 connected to L2 lead 60. The other relay Ry1 lead 64 is connected via double throw switch 68 to either contact 69 to L2 lead 60, or alternate contact 70 to L1 lead 58. The conversation obstruction relay power circuit 38 also includes a short circuit line 63 for short circuiting relay coil Ry1 which is connected from L1 lead 58 via lead 71, lead 72, Ry1 switch contacts 73–74, lead 75, latching relay 35 switch contacts 76–77 to L2 lead 60.

The reverse power relay circuit 34 is connected to power source L2 via lead 78, rectifying diode D1, Ry1 switch contacts 79–80, lead 81, capacitor C1, lead 82, relay coil Ry2, leads 83, 84, latching relay 35 switch contacts 85–86 and thence to power lead L1. However, relay coil Ry2 is normally short circuited by a lead 87 running from lead 82 through Ry1 contacts 88–89 and lead 90 to lead 83. Leads 82 and 83 are also bridged by capacitor C2. Any charge accumulated in capacitor C2 when line polarity flows in its initial direction (that is when the calling and the called telephones are not in contact) discharges through relay coil Ry2 upon reversal of polarity in a direction to hold the latching relay switch contacts in their normal position, illustrated in FIG. 1.

Rectifying diode D1 permits current to pass only in a direction to charge capacitor C1 and prevents leakage of the charge when the polarity of leads L1 and L2 reverse (that is when the called telephone is reached). However, rectifying diode D1 may be bypassed by a circuit line including lead 91 connected to lead 78, coin-controlled switch S, Ry1 contacts 92–93 and lead 94 connected to lead 81.

Relay coil Ry2 may also be short circuited by a nickel (i.e., a U.S. 5¢ coin) counting circuit line including lead 95 connecting lead 91, nickel counting microswitch 96 and lead 97 connected to L1 lead 58. Nickel counting microswitch 95 is closed by a first 5¢ coin and opened by a second 5¢ coin thus preventing a single such coin from energizing relay Ry2.

Return relay power circuit 36 for return relay coil Ry3 is a series circuit joining line power sources L1 and L2 via lead 100, coil Ry3, rectifying diode D2, and latching relay contacts 98–99. Rectifying diode D2 is positioned to prevent passage of current through relay coil Ry3 except when polarity of L1 and L2 is in the initial condition (that is when the calling telephone is not connected to the called telephone).

OPERATION OF THE DEVICE

Before a telephone call is placed, all relay contacts are in the position shown in FIG. 1. Power lead L1 has a negative potential and power lead L2 has a positive potential. Removal of the transmitter-receiver hand set from the hook permits hook switch H to close thus supplying power to the various telephone circuits and to relay Ry1.

Current flow through relay Ry1 has no effect except to more tightly hold the relay contacts in the position shown in FIG. 1, or to move them to that position if they are already not so located. By the caller's manipulation of the dial switches or by assistance of the operator, the calling telephone is connected to the called telephone. The polarity of the L1 power lead then changes to positive and the L2 lead to negative either by operation of automatic equipment or by actions of the operator. The resulting current reversal through relay Ry1 closes Ry1 switch contacts 46–47 and 42–43 to short circuit the transmitter via leads 41, 44, 45 and 48. Closure of Ry1 contacts 46–47 also shunts resistor R across the receiver through leads 49, 48, 50, 52, closed dial switches 54, and lead 56. The short circuiting of the transmitter prevents its use, and the placing of the shunt resistor across the receiver makes it impossible to use it as a transmitter.

Within the reverse relay power circuit 34, the reversal of line polarity discontinues the charging of capacitors C1 and C2. Capacitor C2 discharges through relay Ry2, but this has no effect other than to move the latching relay contacts more tightly to their normal positions, or to so position them if they have not previously been so located. Rectifying diode D1 initially prevents discharge of capacitor C1, and thereafter such discharge is additionally prevented when relay coil Ry1 opens switch contacts 79–80 and 88–89. Ry1 switch contacts 92–93 close, but coin control switch S remains open so that discharge of capacitor C1 or energization of relay coil Ry2 is still not possible until appropriate coins are deposited to close switch S. However, deposit of a single 5¢ coin has no effect since this closes microswitch 96 thus short circuiting Ry2 via leads 95 and 97. Deposit of a second 5¢ coin opens microswitch 96 and then closes switch S. This causes current to flow through coil Ry2 in a direction to reverse the latching relay switch contacts.

Reversal of the latching relay double throw switches 65 and 68 reverses current flow through relay Ry1 even though the line polarity is not changed. This reversal of current flow through coil Ry1 returns the Ry1 contacts to their normal position and removes the short circuit from the transmitter and the shunt from the receiver within short circuit line 63. Closing of the latching relay contacts 76–77 has no effect until the Ry1 contacts 73–74 become closed. Then these contacts short circuit the L1 and L2 leads 58 and 60 via these switch contacts and leads 71, 72 and 75. This cuts off power flow through Ry1.

Opening of the Ry1 contacts 92–93 de-energizes relay coil Ry2. Diode D1 prevents any current flow to relay coil Ry2 after the Ry1 contacts 79–80 and 88–89 return to their initial position.

Operation of relay coil Ry2 also closed normally open latching relay switch contacts 98–99 in the power supply circuit to coil Ry3. However, rectifying diode D2 prevents passage of current through this coil so long as the potential on L1 is negative and L2 is positive. However, when the telephones become disconnected and the polarity reverses, current flows through Ry3 to return all the Ry2–3 switch contacts to their normal positions, illustrated in FIG. 1. The control unit is then ready for the next call to be placed.

It will be apparent that there has been provided a control unit for pay telephones of the post pay type which is primarily electrical in its operation, and which requires little or no mechanical adjustments of its parts so that, accordingly, installation and maintenance costs are reduced.

What is claimed is:

1. For use in a pay telephone system in which current flows in a first direction when the calling and called telephones are not in electrical contact with each other and in a reverse direction when the telephones are in contact and which includes conversation obstruction means actuated by electrical control means responsive to passage of current therethrough, the improvement comprising rectifying means for preventing passage of electric current through said electrical control means while line current is flowing in one of said directions, means for reversing flow of electrical current through said electrical control means in response to the deposit of an appropriate coin to de-activate the conversation obstruction means.

2. The system of claim 1 in which the electrical control means is a capacitor for storing a charge for delivery through a control relay.

3. The system of claim 1 in which the electrical control means is a relay coil.

4. The system of claim 1 in which the elements are mounted on a printed circuit board.

5. In a pay telephone system in which current flows in one direction when the calling and called telephones are not in contact with each other and in a reverse direction when the parties are in contact, and including conversation obstruction means for selectively preventing conversation between the parties and a first relay for operating electrical contacts to place the current conversation obstruction means in the circuit upon change of current flow to said reverse direction when the parties first reach each other, the improvement which comprises second relay means controlling electrical contacts for reversing the current flow through said first relay to the initial direction upon the deposit of an appropriate coin to thereby remove the conversation obstruction means from the circuit while line current flow continues in said reverse direction.

6. The structure of claim 5 including switch means controlled by said first relay means for discontinuing operation of said second relay means.

7. The structure of claim 5 including third relay means for restoring the contacts controlled by the second relay means to their initial position, and rectifying means preventing passage of electric current through the third relay means when line current flows in said reverse direction, whereby upon completion of call and return of line current flow to the initial direction, the third relay is actuated.

8. The structure of claim 7 including switch means for controlling current flow to the third relay means which are closed by operation of the second relay means and opened by movement of the third relay means itself, whereby the third relay means can only be energized by energization of the second relay and shuts off its own power supply after it restores the second relay contacts to their initial position.

9. The structure of claim 8 in which the circuit elements are mounted upon a circuit board on which the circuit contacts and leads are printed with a conductive material.

10. The structure of claim 5 including capacitor means for storing a charge during passage of current in said initial direction prior to reversal of line polarity, means for holding said charge in the capacitor subsequent to the reversal of line polarity, and means for releasing said stored charge to energize the second relay upon the deposit of an appropriate coin.

11. The structure of claim 10 in which the means for holding said charge in the capacitor includes a rectifier, and means for releasing said stored charge includes an electrical line bypassing said rectifier and including switch means closed by deposit of an appropriate coin.

12. The structure of claim 10 including switch means in said rectifier line opened by said first relay means.

13. The structure of claim 10 including an electrical line paralleling said second relay means and connecting a point on one side of said relay to a point located between said capacitor means and the other side of said relay, means for supplying power to said relay and said parallel bypass line, and switch means in said parallel bypass line controlled by said first relay means.

14. The structure of claim 13 including second capacitor means arranged in parallel with the second relay means and the said parallel bypass line, a reversible power source connected to said second relay, said bypass line and said second capacitor means, whereby upon reversal of said polarity and opening of the switch means and said parallel bypass line, any charge accumulated in said second capacitor means will discharge through said second relay means.

References Cited

UNITED STATES PATENTS 2,820,847 1/1958 King ---------------- 179—6.3

KATHLEEN H. CLAFFY, Primary Examiner

J. S. BLACK, Assistant Examiner